United States Patent Office 2,843,520
Patented July 15, 1958

2,843,520

PRODUCTS AND PROCESS

Richard S. Kittila, Hockessin, Del., assignor to E. I. du Pont de Nemours and Company, Wilmington, Del., a corporation of Delaware No Drawing. Application June 25, 1956
Serial No. 593,352

9 Claims. (Cl. 167—33)

This invention relates to arylpyridylketimines, to their preparation, to their formulations for use as foliar fungicides, and to processes for the control of fungi.

The arylpyridylketimines of this invention are represented by the following structural formula:

(1)
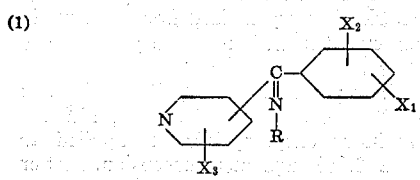

wherein $X_1$, $X_2$ and $X_3$ may be the same or different and represent hydrogen, lower alkyl, lower alkoxy, halogen, dialkylamino, or alkylthio groups; and R represents hydrogen, lower alkyl, aryl or acyl. Thus, $X_1$, $X_2$ and $X_3$ may be lower alkyl ($C_1$–$C_6$) groups such as methyl, ethyl, propyl, isopropyl, butyl, sec. butyl, amyl, isoamyl, hexyl and the like, or halogen such as chlorine, bromine, iodine or fluorine. Also $X_1$, $X_2$ and $X_3$ may be lower alkoxy groups such as methoxy, ethoxy, propoxy, butoxy, pentoxy, hexoxy, and the like; or dialkylamino groups such as, for example, dimethylamino, diethylamino, didodecyl, or dioctadecyl; or alkylthio groups such as, for instance, methylthio, ethylthio, propylthio, amylthio, decylthio, hexadecylthio, octadecylthio, or eicosylthio. The R in Formula 1 may be hydrogen, an alkyl group having from 1 to 6 carbon atoms, or any aryl or acyl group. For instance, aryl may be phenyl, tolyl, salicyl, or naphthyl and acyl may be acetyl, halogenoacetyl such as, for instance, chloroacetyl, dibromoacetyl, trifluoroacetyl, iodoacetyl, or dichloroacetyl, benzoyl, and benzene-sulfonyl.

Preferred arylpyridylketimines of the invention are those in which $X_1$ is hydrogen, $X_2$ is hydrogen or chlorine, $X_3$ is hydrogen, and R is hydrogen.

It will be understood that the nitrogen atom of the pyridyl group attached thru carbon to the ketimino group of the compounds of the invention as represented by Formula 1 can be in the 2, 3, or 4 position. It will be further understood that the compounds of the present invention can exist in geometrically isomeric forms cis and trans or syn and anti. Where the formula or chemical name represents a specific isomer, there will be found under the formula or in the name an appropriate designation.

Specifically included among the compounds of this invention are 4-(p-iodo-alpha-iminobenzyl)pyridine
3-(p-fluoro-alpha-iminobenzyl)pyridine
3-(p-chloro-alpha-iminobenzyl)-5-dimethylaminopyridine
5-(m-methoxy-alpha-iminobenzyl)-2-methylpyridine
3-(3,4-dichloro-alpha-iminobenzyl)-5-chloropyridine
3-(m-methylthio-alpha-iminobenzyl)-6-ethoxypyridine
2-(p-methyl-alpha-iminobenzyl)-4-chloropyridine
4-(p-chloro-alpha-phenyliminobenzyl)pyridine
N-[p-methyl-alpha-(2-pyridyl)benzilidine]acetamide
2-(p-methoxy-alpha-phenyliminobenzyl)pyridine
N-[m-ethylthio-alpha-(3-pyridyl)benzilidine]benzamide The above-named compounds and others of Formula 1 are in most instances low-melting solids or high-boiling liquids which are soluble in ether and acetone.

The arylpyridylketimines of the invention can be prepared by the addition of a pyridyl nitrile of the formula (2)

to a Grignard reagent of the formula (3)

wherein $X_1$ and $X_2$ have the same significance as in Formula 1 and hal represents a halogen, bromine, chlorine or iodine, and hydrolyzing the resulting product with ammonium chloride.

This Grignard reaction is usually carried out in the presence of an organic solvent, diethyl ether and dibutyl ether being preferred, although other organic solvents, suitable for use in Grignard reactions, such as benzene, toluene, or anisole, can also be employed. In some instances dimethylformamide may also be used. The preparation of the aryl magnesium halide (Grignard reagent) is usually conducted at the boiling point of the solvent employed, although other temperatures between about zero and 150° C., preferably below 100° C., may also be used, a longer reaction period being required in the lower temperature range. A crystal of iodine may be used to initiate the reaction between the magnesium and the halide.

To the resulting arylmagnesium halide of Formula 3 there is added the pyridyl nitrile. This addition is usually conducted at about the boiling point of the solvent employed, i. e., at the reflux temperature, although other temperatures between about 0° C. and 150° C. may also be used. The resulting product is then hydrolyzed with ammonium chloride solution, whereupon the desired product separates from the mixture. The hydrolysis is effected at a temperature below 25° C. and preferably below 0° C. Lithium aryls may be substituted for the aryl magnesium halides with the same results.

The pyridyl nitriles of Formula 2 and the Grignard reagents of Formula 3 used in preparing the compounds of this invention are known compounds. They are prepared by methods known to those skilled in the art using readily available starting materials. Lithium aryls may be substituted for the aryl magnesium halides with the same results.

I have found that the arylpyridylketimines of this invention are effective fungicides. They can be formulated into the conventional types of fungicidal compositions that are highly effective as anti-fungal agents, particularly as foliar fungicidal sprays.

In practicing the fungicidal methods of my invention, an arylpyridylketimine of the invention is applied to the material to be treated for the control of fungi at a dosage sufficient to exert fungicidal action. Accordingly, my compounds can be used, for example, to treat living plants such as vegetables, ornamental plants, and fruit-bearing trees. Also they may be used to treat organic fibers or fabrics, leather and various cellulosic materials such as paper and wood. Likewise, they may be used to treat paints and lubricating oils. Their greatest utility appears to be in the preventing of fungus infections of agricultural crops or ornamental plants.

The dosage employed in the fungicidal methods of the invention is largely determined by and dependent upon the particular fungicidal compound selected, and, in the case of application to vegetation, the susceptibility of the particular vegetation to the compound selected, the state and condition of growth of the vegetation to be treated, and the climatic conditions.

In general, the fungicidal compositions of my invention contain in sufficient amount to exert fungicidal action a compound of Formula 1 as an active ingredient in admixture with a carrier material or conditioning agent of the kind used and commonly referred to in the art as a fungicide adjuvant or modifier. Usually from about 1% to 95% by weight of the fungicidal composition is active ingredient.

The conventional fungicide adjuvants are inert solids, organic liquid diluents and surface-active agents. They provide formulations adapted for ready and efficient application using conventional applicator equipment. Thus, one or more of my fungicidally active compounds is admixed with a fungicide adjuvant material to provide a formulation in liquid or solid form.

Solid compositions are preferably in the form of powders. They are compounded to be homogeneous powders that either can be used as such, diluted with inert solids to form dusts or suspended in a suitable liquid medium for spray application. The powders can comprise principally the active ingredient and minor amounts of conditioning agent. They can also be prepared by admixing the active compound with large amounts of finely divided inert solids. Natural clays, either absorptive such as attapulgite or relatively non-absorptive such as china clays, diatomaceous earth, walnut shell flour, redwood flour, synthetic fine silica, calcium silicate and other inert solid carriers of the kind conventionally employed in wettable powder fungicidal compositions can be used. The active ingredient usually makes up from about 25 to 90% of these wettable powder compositions. Suitable diluents for conversion to dusts are talc, pyrophyllite, tobacco dust, volcanic ash and other dense rapid settling inert solids.

Liquid compositions employing one or more of the fungicidal compounds of my invention are prepared by admixing the active ingredient with a suitable liquid diluent media. The active ingredient can be either in solution or in suspension in the liquid media. Typical of the liquid media commonly employed as fungicide adjuvants are water, kerosene, Stoddard solvent, xylene, alcohols, alkylated naphthalene, and glycols. The active ingredient usually makes up from about 0.5 to 50% of these liquid compositions. Some of these compositions are designed to be used as such, others to be extended with large quantities of water.

Compositions in the form of wettable powders or liquids in many cases also include a surface-active agent of the kind sometimes referred to in the art as a wetting, dispersing or emulsifying agent. These materials cause the compositions to disperse or emulsify easily in water so as to give aqueous sprays.

The surface-active agents employed can be of the anionic, cationic or nonionic type. They include for example, sodium oleate, sulfonated petroleum oils, alkyl aryl sulfonates, sodium lauryl sulfate, polyethylene oxides, lignin sulfonates, and other surface-active agents. A detailed list of such agents is set forth in articles by McCutcheon in "Soap and Chemical Specialties," volume 31, No. 7, pages 50–61; No. 8, pages 48–61; No. 9, pages 52–67; and No. 10, pages 48–67 (1955).

The compositions of the invention can include other fungicidally active materials, insecticides, and the like as is usual in pest control compositions.

In order that the invention may be better understood, reference should be had to the following illustrative examples:

*Example 1.—4-(p-chloro-alpha-iminobenzyl)pyridine*

The preparation of this compound is carried out under typical Grignard conditions to insure an anhydrous nitrogen atmospere in the reaction flask.

A solution of 21 g. of p-bromochlorobenzene in 50 ml. of ether is added dropwise with stirring to a flask containing 2.6 g. magnesium and 50 ml. of anhydrous ether. A crystal of iodine is used to initiate the reaction. After all the magnesium has reacted, a solution of 104 g. of isonicotinonitrile in 150 ml. of ether is added to the Grignard reagent at reflux and refluxing is then continued for 2½ hours.

The reaction mixture is then hydrolyzed by adding 17 ml. of saturated ammonium chloride solution dropwise with stirring. The ether is decanted and the solid washed twice with ether. The ether is evaporated to yield 14.9 g. of a mixture of crystals and oil. An analytical sample is recrystallized twice from cyclohexane-benzene to yield material melting at 111.5–113° (corr.). The remaining material is recrystallized first from methanol and then from cyclohexane-benzene to yield 3.85 g. M. P. 111–117° (corr.).

*Analysis.*—Calc'd for $C_{12}H_9ClN_2$: C, 66.51; H, 4.19; N, 12.93. Found: C, 66.67; H, 4.30; N, 12.94, 12.98.

4-(p-chloro-alpha-iminobenzyl)pyridine is applied to tomato foliage as a 0.2% aqueous suspension. After the spray deposit dries, the foliage is inoculated with a spore suspension of *Alternaria solani* (the cause of tomato early blight). The foliage is then incubated at a temperature and relative humidity suitable for rapid disease development. When visible lesions appear on the controls, lesion counts are made. It has been found that 4-(p-chloro-alpha-iminobenzyl)pyridine allowed 0% disease based on control counts equaling 100%.

*Example 2.—4-(p-methoxy-alpha-iminobenzyl)pyridine*

The preparation of this compound is carried out as in Example 1 with a Grignard reagent prepared from 22.2 g. of p-bromoanisole. The nitrile is added as a solid or by extraction. The ether yields 10 g. of an amber oil which is distilled to give 4.95 g. of a solid M. P. 70–88° (23%). An analytical sample M. P. 90–93° is obtained by repeated recrystallization from a benzene-cyclohexane mixture.

*Analysis.*—Calc'd for $C_{13}H_{12}N_2O$: C, 73.56; H, 5.70; N, 13.20. Found: C, 73.80; H, 5.86; N, 13.22.

4-(p-methoxy-alpha-iminobenzyl)pyridine is applied to tomato foliage as a 0.2% aqueous suspension. After the spray deposit dries, the foliage is inoculated with a spore suspension of *Alternaria solani* (the cause of tomato early blight). The foliage is then incubated at a temperature and relative humidity suitable for rapid disease development. When visible lesions appear on the controls, lesion counts are made. It has been found that 4-(p-methoxy-alpha-iminobenzyl)pyridine allowed 0% disease based on control counts equaling 100%.

*Example 3.—4-(p-methyl-4-iminobenzyl)pyridine*

The preparation is effected as in Example 2 using the Grignard reagent prepared from 13 ml. of p-bromotoluene. Yield 12.3 g. (38%) M. P. 70–71.5°.

*Analysis.*—Calc'd for $C_{13}H_{12}N_2$: C, 79.56; H, 6.17. Found: C, 79.32; N, 6.21.

4-(p-methyl-4-iminobenzyl)pyridine is applied to tomato foliage as a 0.2% aqueous suspension. After the spray deposit dries, the foliage is inoculated with a spore suspension of *Alternaria solani* (the cause of tomato early blight). The foliage is then incubated at a temperature and relative humidity suitable for rapid disease development. When visible lesions appear on the controls, lesion counts are made. It has been found that 4-(p-methyl-4- iminobenzyl)pyridine allowed 2% disease based on control counts equaling 100%.

*Example 4.—4-(3,4-dichloro-alpha-iminobenzyl)-pyridine*

This preparation is carried out as above with the Grignard reagent prepared from 29.5 g. of 3,4-dichlorobromobenzene to yield 6 g. of light yellow crystals (24%), M. P. 119–122° (corr.) A sample recrystallized for analysis melted at 122–123°.

*Analysis.*—Calc'd: for $C_{12}H_8Cl_2N_2$: C, 57.39; H, 3.21; N, 11.16. Found: C, 57.77; H, 3.42; N, 11.15.

4-(3,4-dichloro-alpha-iminobenzyl)pyridine is applied to tomato foliage as a 0.2% aqueous suspension. After the spray deposit dries, the foliage is inoculated with a spore suspension of *Alternaria solani* (the cause of tomato early blight). The foliage is then incubated at a temperature and relative humidity suitable for rapid disease development. When visible lesions appear on the controls, lesion counts are made. It has been found that 4-(3,4-dichloro-alpha-iminobenzyl)pyridine allowed 0% disease based on control counts equaling 100%.

*Example 5.—Alpha-iminobenzylpyridine*

This preparation is carried out following substantially the procedure given in Example 1. The Grignard reagent is prepared from 23 ml. of bromobenzene and twice the amount of other materials used in Example 1 are employed. Following hydrolysis of the reaction mixture at 10–15° C., the resulting liquid product, B. P. 119/0.2 mm.–122/0.3 mm. (yield 55%) was collected.

Alpha-iminobenzylpyridine is applied to tomato foliage as a 0.2% aqueous suspension. After the spray deposit dries, the foliage is inoculated with a spore suspension of *Alternaria solani* (the cause of tomato early blight). The foliage is then incubated at a temperature and relative humidity suitable for rapid disease development. When visible lesions appear on the controls, lesion counts are made. It has been found that alpha-iminobenzylpyridine allowed 5% disease based on control counts equaling 100%.

*Example 6.—4-(p-fluoro-alpha-iminobenzyl)pyridine*

The preparation is carried out as in Example 5 using the Grignard reagent prepared from 25 ml. of p-fluorobromobenzene. The Grignard addition complex is hydrolyzed at −10° to +10° C. The resulting product is a liquid, B. P. 130–134°/0.5 mm.; yield 55°.

4-(p-fluoro-alpha-iminobenzyl)pyridine is applied to tomato foliage as a 0.2% aqueous suspension. After the spray deposit dries, the foliage is inoculated with a spore suspension of *Alternaria solani* (the cause of tomato early blight). The foliage is then incubated at a temperature and relative humidity suitable for rapid disease development. When visible lesions appear on the controls, lesion counts are made. It has been found that 4-(p-fluoro-alpha-iminobenzyl)pyridine allowed 12% disease based on control counts equaling 100%.

*Example 7.—4-(p-bromo-alpha-iminobenzyl)pyridine*

The compound of this example is prepared as in Example 6 using the Grignard reagent prepared from 55 g. of p-dibromobenzene. The desired product is a solid M. P. 112–119° (20%), which upon recrystallization melts 117–120°.

4-(p-bromo-alpha-iminobenzyl)pyridine is applied to tomato foliage as a 0.2% aqueous suspension. After the spray deposit dries, the foliage is inoculated with a spore suspension of *Alternaria solani* (the cause of tomato early blight). The foliage is then incubated at a temperature and relative humidity suitable for rapid disease development. When visible lesions appear on the controls, lesion counts are made. It has been found that 4-(p-bromo-alpha-iminobenzyl)pyridine allowed 0% disease based on control counts equaling 100%.

*Example 8.—4-(p-chloro-alpha-phenyliminobenzyl) pyridine*

A mixture of 2.16 g. of 4-(p-chloro-alpha-iminobenzyl)pyridine and 2 ml. of aniline are heated at 180° for 1 hour. Ammonia is eliminated. The mixture is diluted with several volumes of cyclohexane to precipitate a solid which is recrystallized from cyclohexane to yield 1.5 g. M. P. 140–141.5° (corr.) (yield, 51%).

*Analysis.*—Calc'd: for $C_{18}H_{13}ClN_2$: N, 9.58. Found: N, 9.72.

*Example 9.—4-(3-methoxy-alpha-iminobenzyl)pyridine*

This compound is prepared following substantially the procedure of Example 5 except that the Grignard reagent is prepared from 37.4 g. of 3 bromoanisole.

*Example 10.—3-(p-chloro-alpha-iminobenzyl)pyridine*

This compound is prepared as in Example 1 except that nicotinonitrile is substituted for isonicotinonitrile. The reaction mixture is hydrolyzed at −10 to 0°.

*Example 11.—2-(p-chloro-alpha-iminobenzyl)pyridine*

Picolinonitrile is substituted for isonicotinonitrile in the procedure of Example 1 to give this compound.

*Example 12.—2-methoxy-4(p-chloro-alpha-iminobenzyl) pyridine*

Following substantially the procedure of Example 1 the above compound is prepared using nicotinonitrile in place of the isonicotinonitrile, and doubling amounts of other materials.

*Example 13.—4-(3-chloro-4-methoxy-alpha-iminobenzyl) pyridine*

This compound is prepared by the procedure of Example 4 except that the Grignard reagent is prepared from 38.2 g. of 2-chloro-4-bromoanisole.

*Example 14.—4-(3-chloro-4-bromo-alpha-iminobenzyl) pyridine*

Following the procedure of Example 5 except that the Grignard reagent is prepared from 54.1 g. of 2-chloro-1,4-dibromobenzene, the compound is prepared in good yield.

*Example 15.—4-(p-chloro-alpha-methyliminobenzyl) pyridine*

A mixture of 5 g. of methylamine and 2.16 g. of 4-(p-chloro-alpha-iminobenzyl)pyridine is heated at 200° for 1 hour. The excess amine is distilled off to yield the product.

*Example 16.—N-(p-chloro-(4-pyridyl)-benzilidine) acetamide*

A mixture of 2.16 g. of 4(p-chloro-alpha-iminobenzyl) pyridine and 1.2 g. of acetic anhydride are combined and after the reaction is completed, the solution is made basic and the product isolated.

*Example 17*

Ten grams of 4-(p-methoxy-alpha-iminobenzyl)pyridine are dissolved in a mixture of 85 grams of xylene and 5 grams of an emulsifier consisting of polyoxyethylene sorbitol esters of mixed fatty and rosin acids (Atlox 1256). Two parts of this clear solution are then added to 98 parts of water to give an oil-in-water emulsion containing 0.2% of the arylpyridylketimine in the oil phase.

*Example 18*

Ten grams of 4-(p-chloro-alpha-iminobenzyl)pyridine are dissolved in a mixture of 85 grams of benzene and 5 grams of an emulsifier consisting of polyoxyethylene sorbitol esters of mixed fatty and rosin acids (Atlox 1256).. Two parts of this clear solution are then added to 98 parts of water to give an oil-in-water emulsion containing 0.2% of the 4-(p-chloro-alpha-iminobenzyl)pyridine in the oil phase.

Example 19

In a manner similar to Example 18 except benzene was replaced by alkylated naphthalene, an oil-in-water emulsion containing 0.2% of 4-(p-methyl-4-iminobenzyl) pyridine was prepared.

Example 20

|   | Percent |
|---|---|
| 4-(p-chloro-alpha-phenylimino-benzyl)pyridine | 30 |
| Sodium lignin sulfonate | 15 |
| Hydrated attapulgite | 1.75 |
| Water | 53.25 |

The above components are milled together as a slurry in a ball mill until the active material is substantially all less than 10 microns in particle size. The stable, thixotropic suspension so formed may be diluted with water and applied as a spray.

I claim:

1. A process for the control of fungi comprising applying to organic matter subject to fungicidal attack, a compound of the formula

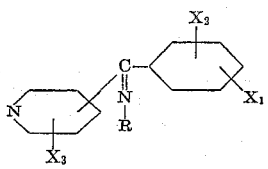

where $X_1$, $X_2$, and $X_3$ are members of the class consisting of hydrogen, lower alkyl, lower alkoxy and halogen groups, and R is a member of the class consisting of hydrogen, lower alkyl, phenyl and lower aliphatic acyl groups.

2. A composition adapted for application as a fungicide comprising an arylpyridylketimine defined in claim 1 in admixture with a fungicide adjuvant.

3. A compound of the formula

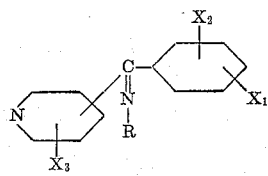

where $X_1$, $X_2$, and $X_3$ are members of the class consisting of hydrogen, lower alkyl, lower alkoxy and halogen groups, and R is a member of the class consisting of hydrogen, lower alkyl, phenyl and lower aliphatic acyl groups.

4. A process for making a compound of claim 3 which comprises the steps of adding to an arylmagnesium halide of the formula

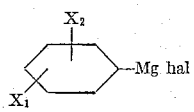

wherein $X_1$ and $X_2$ have the same significance as in claim 3 and hal represents a halogen of the class consisting of chlorine, bromine and iodine, a pyridylnitrile of the formula

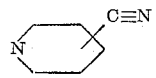

in the presence of inert organic solvent, and hydrolyzing the resulting product at a temperature not exceeding 25° C.

5. 4-(p-chloro-alpha-iminobenzyl)pyridine.
6. 4-(p-methoxy-alpha-iminobenzyl)pyridine.
7. 4-(3,4-dichloro-alpha-iminobenzyl-pyridine.
8. 4-(p-bromo-alpha-iminobenzyl)pyridine.
9. 4-(p-methyl-alpha-iminobenzyl)pyridine.

References Cited in the file of this patent

Tschitschibabin; Beilstein (Handbuch, 4th ed.), vol. 21, page 331 (1935).